United States Patent Office 3,228,769

Patented Jan. 11, 1966

3,228,769

PHOTOSENSITIVE COPY-SHEET COMPRISING ZINC OXIDE AND A DIAZONIUM COMPOUND AND METHOD OF COPYING

Wesley R. Workman, St. Paul, Minn., assignor to Minnesota Mining and Manufacturing Company, St. Paul, Minn., a corporation of Delaware No Drawing. Filed May 4, 1961, Ser. No. 107,641
6 Claims. (Cl. 96—49)

This invention relates to copy-sheets useful in making copies of graphic originals and for other purposes, and has particular reference to copy-sheets which are sensitive to the action of both light and heat. The sheets find utility in the copying of originals having differentially radiation-absorptive image and background areas by a modified thermographic or thermocopying progress involving brief intense irradiation of the original while in heat-conductive association with the heat-sensitive copy-sheet, followed by exposure to actinic light which desensitizes the unheated areas. They are also useful in copying originals having differentially light-transmissive image and background areas by a modified diazotype process involving exposure of the copy-sheet to a light-pattern through the original followed by heating to develop a visible image in the areas protected from the light. Heat patterns and light patterns applied in other ways may also be reproduced on these copy-sheets in the form of permanent copies.

The diazotype process ordinarily involves the exposure to a light-image of a sensitive sheet containing a light-sensitive diazonium compound and an azo dye coupler, followed by treatment of the exposed sheet with an alkaline developer in solution or vapor form to initiate a dye-forming reaction between the unexposed diazonium compound and the coupler. The requirements have been well described in Greig U.S. Patent No. 2,691,587 wherein is further described a heat-sensitive color-developing sheet material. Placing the latter in surface contact with the exposed diazotype sheet and applying heat sufficient to melt the color-developing material is stated to result in the initiation of the dye-forming reaction and development of a permanent visible copy.

A later form of diazotype sheet is described in Morrison U.S. Patent No. 2,732,299. A conventional sheet such as an Ozalid diazo paper is coated with a very thin layer of urea. After exposure, an image is developed by the application of heat, the urea presumably decomposing to liberate ammonia which initiates the dye-forming reaction.

The present invention likewise provides a unitary or self-sufficient copy-sheet which requires no external application of vapors, solutions or other reactants. Copies or prints are prepared through the exclusive agencies of light and heat. In addition, copy-sheets are made available which are highly resistant to deterioration or premature reaction during storage at high humidities.

It has now been found that diazotype copy-sheets may be rendered heat-developable by incorporating zinc oxide in the sensitive layer, and that the resulting product may be stored in a moist atmosphere for protracted periods without loss of sensitivity and without deleterious pre-reaction. Copies prepared with such sheet materials are permanent, being substantially unchanged on prolonged storage and not subject to further chemical action under elevated temperatures or intense illumination. Background color, initially present from the diazo reactant, is reduced during exposure to light and is minimized by the presence of the zinc oxide.

The copy-sheets of the present invention are particularly useful in making permanent copies of differentially radiation-absorptive graphic originals by the thermocopying method. The heat-pattern provided by brief intense irradiation of the original while in heat-conductive contact with the copy-sheet is sufficient to develop a corresponding color image on the sensitive sheet. Subsequent exposure of the sheet to diffuse light, for example by normal exposure in an office lighted with daylight or, even better, with many types of fluorescent lights, then gradually desensitizes and whitens the non-image areas of the copy, producing a permanent copy having high contrast.

A preferred form of copy-sheet is made, in accordance with the invention, by coating a thin flexible backing with a sub-coat containing the zinc oxide dispersed in a moisture-resistant polymeric binder, together with one or another of the color-forming compounds or adjuvants if desired; and then applying a further coating containing the remaining reactant materials in a different binder and using as the volatile solvent a liquid which is a non-solvent for the binder of the sub-coat. Alternatively, one or another of the components may be deposited within the fibrous structure of a paper backing, and the remaining components supplied in a surface coating. Thin plastic film may replace the paper backing. Metal foil backings are useful for copy-sheets requiring high dimensional stability, the copy being produced by exposing to a light-image followed by heating to develop the unexposed areas.

Any of the conventional light-sensitive diazonium compounds and azo coupler components employed in the two component diazotype process may be used in the practice of this invention; and such materials are well known, as shown by the Greig and Morrison patents hereinbefore identified. For best results in terms of moisture resistance, these materials should be selected from among the more water-insoluble diazonium and coupler compounds. Preferred diazonium salts for use in the practice of this invention are obtained by diazotizing such amines as p-diethylaminoaniline, p-($\beta$-hydroxyethyl ethylamino)aniline, p-dethylamino-o-methylaniline, and p-dipropylaminoaniline. Azo couplers useful with such salts are preferably 2,3-dihydroxynaphthalene or resorcinol, or substituted derivatives thereof. In most instances the mixture is further compounded with adjuvants such as acid stabilizers, coupling promoters, and various inert additives, e.g. pigments, dyes, fillers, plasticizers, soaps, waxes, wetting agents. These preferably water-insoluble and non-hygroscopic. Numerous classes of inert polymeric binders have been found useful in each of the coatings, providing only that the binder for the zinc oxide component be adequately moisture-resistant, and that the binder for the diazonium compound be adequately polar to permit ionization of the acid stabilizer, and soluble in the class of solvents needed to dissolve the diazonium compound.

When present in the preferred structure, i.e. in a sub-coat containing neither coupler nor diazonium compound, the zinc oxide component is effective with approximately from one-half to twice its weight of moisture-resistant binder. At lower proportions of zinc oxide the intensity of the image color is diminished; at higher proportions, stability under high humidity decreases. The total amount of the zinc oxide coating should be sufficient to provide a uniform base for the color-forming coat but need not be in excess of this amount. The oxide may be pretreated with materials designed to improve its ability to blend with the binder; fatty acid amides are exemplary.

The following specific examples will serve further to illustrate but not to limit the invention.

*Example 1*

To a ball milled mixture of 5 g. of zinc oxide, 5 g. of "Pliolite S–7" copolymer of 3 parts butadiene and 1 part styrene, 15 g. of toluene, and 15 g. of acetone was added 0.5 g. of 1-phenyl-2-thiourea dissolved in a small amount of acetone. This material was then uniformly coated on white paper in a knife coater at a thickness of 3 mils and then dried. On top of this was coated a 4 mil layer of a solution prepared by dissolving 0.50 g. of saccharin, 0.30 g. of 2,3-dihydroxynaphthalene, 0.15 g. of pi-diethylaminobenzenediazonium hexafluorophosphate, 2.25 g. of cellulose acetate, and 2.25 g. of polyvinyl acetate in 40 g. of acetone. After drying in the absence of actinic light, the yellow paper could be locally heated to form a blue azo dye image and then exposed to actinic light to remove the yellow color and leave the blue image on a white background. Exposing the yellow coated paper to actinic light through a suitable original having an opaque image on a transparent background and then heating the entire paper at 120–150 C. was equally effective in developing the characteristic blue azo dye in the unexposed areas. To determine the stability of the unexposed yellow paper to storage at high humidity, a sample was stored six days at 95–100% relative humidity and 20° C. These conditions did not adversely affect the yellow color of the unexposed sample and this sample could then be exposed and heat developed as previously described.

*Example 2*

Ball milled mixtures were prepared of the following:

A.—20 g. of zinc oxide, 10 g. of "Parapol S–50" copolymer of equal parts of styrene and isobutylene, and 90 g. of heptane, B.—2.5 g. of 1-phenylthiourea, 5 g. of "Parapol S–50" copolymer, and 45 g. of heptane, C.—2.5 g. of 2,3-dihydroxynaphthalene, 5 g. of "Parapol S–50" copolymer, and 45 g. of heptane.

After blending 6.0 g. of A, 4.2 g. of B, and 2.1 g. of C, the mixture was applied 3 mils thick on heavy white paper and dried. A 4-mil thick coat of a solution composed of 0.5 g. of saccharin, 0.2 g. of p-diethylaminobenzenediazonium hexafluorophosphate, 2.1 g. of polyvinyl acetate, 2.1 g. of cellulose acetate, and 38.8 g. of acetone was applied to this zinc oxide layer and the sheet was then dried in a dark room. After storage 7 days at 95–100% relative humidity and 20° C., the sample could be exposed and heat developed as in Example 1 to form the expected blue azo images of the same intensity as could be formed from the paper before the humidity treatment. The exposed area of the humidity treated sample was just faintly blue, indicating a slight premature development by moisture. A similar paper prepared as above except for replacement of saccharin in the second coating by citric acid was affected to a greater extent by the above moisture treatment; however, the material was still light sensitive and could be heat developed to a blue image on a light blue background.

*Example 3*

To make the zinc oxide surface more oleophilic and thus more readily covered by the moisture-impermeable binder, 50 g. of zinc oxide was ball milled with a methanol solution containing 2.5 g. of a coconut oil amide ("Armid C"). The zinc oxide was collected on a filter, washed repeatedly with methanol to remove unadsorbed "Armid C," and then dried. This oleophilic zinc oxide blended readily into a heptane solution of a polyisobutylene binder ("Vistanex L–140"), whereas ball milling of the untreated zinc oxide in a similar solvent-binder solution for six days did not result in a smooth blend. A ball milled mixture of 7.5 g. of "Armid C" coated zinc oxide, 7.5 g. of "Vistanex L–140," and 92.5 g. of heptane was applied 3 mils thick on heavy white paper and dried. On this was coated a 4 mil layer of a solution of 1.1 g. of saccharin, 0.5 g. of thiourea, 0.3 g. of 2,3-dihydroxynaphthalene, 0.15 g. of p-diethylaminobenzenediazonium hexafluorophosphate, 2.2 g. of polyvinyl acetate, and 2.2 g. of cellulose acetate in 40 g. of acetone. After thorough drying in a dark room the yellow sheet could be locally heated to form a blue image and then exposed to actinic light to both remove the yellow color and make the background areas no longer heat sensitive. Alternatively, the sheet could be exposed to actinic light behind a suitable transparency and the entire sheet heated to develop the blue azo dye in the unexposed image area. Heating could be accomplished in an oven at 120–150° C. or between heated glass plates at 110° in a few seconds. A sample of the original yellow sheet was stored in an atmosphere of 95–100% relative humidity at 20° C. without affecting the original yellow color. Exposure and heat development of this moisture treated sample resulted in a copy having images of equal density as formed by the original copy paper and with a background only very faintly blue, even after storage for seven days of high humidity.

*Example 4*

"Mylar" tensilized polyethylene terephthalate thin transparent polyester film was coated with a 1½ mil layer of a ball milled mixture of 10 g. of very finely powdered zinc oxide (Kadox 515), 10 g. of "Pliolite S–7" copolymer, and 50 g. of a mixture of equal parts of acetone and toluene, and the coating was dried thoroughly. This film was then further coated with a 2 mil layer of a mixture of 1.0 g. of resorcinol, 0.5 g. of p-diethylaminobenzenediazonium chloride zinc chloride double salt, and 4.0 g. of "Zytel" polyamide binder in 16 g. of methanol and the resulting yellow film dried in a dark room. Exposure of this material behind a suitable original followed by heat development resulted in brown images on a translucent background. This intermediate copy performed very well as a second original for preparing other diazotype copies. Alternatively, images could be formed by thermocopying, the yellow color removed by exposure to actinic light, and the resultant copy used as an original for preparation of diazotype copies. A sample of the original yellow film was placed in an atmosphere of 95–100% relative humidity at 20° C. for 12 days. Even after this extended storage at high humidity, the sheet was still useful in preparing intermediate copies.

What is claimed is as follows:

1. The method of producing graphic copy comprising: exposing to a light-image a sensitized copy-sheet surface comprising a light-sensitive diazonium compound, an azo dye coupler, and zinc oxide, the zinc oxide being in a sub-stratum of said sensitized surface and dispersed in a water-resistant first binder material and in an amount by weight of from about one-half to about two times the weight of said binder, and at least one of the said compound and said coupler being in a surface stratum of said sensitized surface adjacent said sub-stratum and dispersed in a second and different binder material, to desensitize said compound at the light-struck area; and heating said surface to obtain a visibly distinct reaction product at the unlighted areas.

2. The method of producing graphic copy comprising: applying a heat-image corresponding to the desired copy to a sensitized copy-sheet surface comprising a light-sensitive diazonium compound, an azo dye coupler, and zinc oxide, the zinc oxide being in a sub-stratum of said sensitized surface and dispersed in a water-resistant first binder material and in an amount by weight of from about one-half to about two times the weight of said binder, and at least one of the said compound and said coupler being in a surface stratum of said sensitized surface adjacent said sub-stratum and dispersed in a second and different binder material, to obtain a visibly distinct reaction product at the heated areas; and exposing said surface to light to desensitize said compound at the unheated areas.

3. A copy-sheet capable of converting to a visibly distinct colored form on brief heating at temperatures up to about 140° C. and of being desensitized against such heat conversion by brief exposure to intense actinic light, said copy-sheet including a sensitive surface comprising a light-sensitive diazonium compound, an azo dye coupler, and zinc oxide, the zinc oxide being in a sub-stratum of said sensitive surface and dispersed in a water-resistant first binder material and in an amount by weight of from about one-half to about two times the weight of said binder material, at least one of said compound and said coupler being in a surface stratum of said sensitive surface adjacent said sub-stratum and dispersed in a second and different binder material, the binder material for the stratum containing said diazonium compound being a polar polymeric film-forming binder material.

4. A copy-sheet capable of converting to a visibly distinct colored form on brief heating at temperatures up to about 140° C. and of being desensitized against such heat conversion by brief exposure to intense actinic light, said copy-sheet comprising a thin flexible backing and a sensitive surface coating comprising a light-sensitive diazonium compound, an azo dye coupler, and zinc oxide, the zinc oxide being in a sub-stratum of said coating and dispersed in a water-resistant first binder material and in an amount by weight of from about one-half to about two times the weight of said binder material, at least one of said compound and said coupler being in a surface stratum of said coating adjacent said sub-stratum and dispersed in a second and different binder material, the binder material for the stratum containing said diazonium compound being a polar polymeric film-forming binder material.

5. A heat-sensitive and light-sensitive copy-sheet having good stability under conditions of high humidity storage, capable of forming localized visibly distinct colored image areas on brief application of a localized heat pattern at temperatures up to about 140° C. and of being desensitized against such heat-induced change by brief exposure to intense actinic light, and comprising: a thin flexible backing; a sub-layer comprising zinc oxide, aromatic substituted thiourea, and substantially moisture-impermeable polymeric film-forming binder material, said zinc oxide being in an amount by weight of from about one-half to about two times the weight of said binder material; and a color-forming layer on said sub-layer and comprising light-sensitive diazonium compound, azo dye coupler, water-insoluble acidic stabilizer, and polar polymeric film-forming binder material which is different from said moisture-impermeable binder material.

6. A heat-sensitive and light-sensitive copy-sheet having good stability under conditions of high humidity storage, capable of forming localized visibly distinct colored image areas on brief application of a localized heat pattern at temperatures up to about 140° C. and of being desensitized against such heat-induced change by brief exposure to intense actinic light, and comprising: a sub-layer comprising zinc oxide, an azo dye coupler, and a substantially moisture-impermeable polymeric film-forming binder material, the amount by weight of said zinc oxide being from about one-half to about twice the amount by weight of said binder material; and a layer on said sub-layer comprising light-sensitive diazonium compound and polar polymeric film-forming binder material, said coupler and diazonium compound being normally non-reactive, and said polar binder material being different from said moisture-impermeable binder material.

References Cited by the Examiner

UNITED STATES PATENTS

| | | | |
|---|---|---|---|
| 2,063,631 | 12/1936 | Schmidt et al. | 96—91 |
| 2,205,991 | 6/1940 | Neugebauer et al. | 96—49 |
| 2,691,587 | 10/1954 | Grieg | 96—49 |
| 2,732,299 | 1/1956 | Morrison | 96—49 |
| 2,755,485 | 7/1956 | Sulich et al. | 96—91 |
| 2,760,431 | 8/1956 | Beatty | 96—33 |
| 2,807,545 | 9/1957 | Frederick | 96—75 |
| 2,939,787 | 6/1960 | Giaimo | 250—65.1 |
| 2,953,471 | 9/1960 | Landau | 96—75 |
| 2,993,805 | 7/1961 | Kay | 96—91 |
| 3,027,256 | 3/1962 | Klimkowski et al. | 96—75 |
| 3,069,365 | 12/1962 | Shely | 96—1 |
| 3,113,022 | 12/1963 | Cassiers et al. | 96—91 |

OTHER REFERENCES

Fukushima et al.: J. Soc. Chem. Ind. Japan 35, Suppl. Binding, 398–9 (1932), abstract in Chem. Abstracts, vol. 26, p. 5848, par. 4 (1932).

NORMAN G. TORCHIN, *Primary Examiner.*

PHILIP E. MANGAN, *Examiner.*